United States Patent
Chien et al.

(10) Patent No.: US 10,257,898 B2
(45) Date of Patent: Apr. 9, 2019

(54) LIGHT-EMITTING DIODE DRIVING APPARATUS AND OPERATING METHOD THEREOF

(71) Applicant: Raydium Semiconductor Corporation, Hsinchu (TW)

(72) Inventors: Hsuan-Hao Chien, Taipei (TW); Shen-Xiang Lin, Taipei (TW); Chih-Jen Hung, Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 15/808,679

(22) Filed: Nov. 9, 2017

(65) Prior Publication Data

US 2018/0132323 A1    May 10, 2018

Related U.S. Application Data

(60) Provisional application No. 62/420,021, filed on Nov. 10, 2016.

(51) Int. Cl.
*H05B 37/02* (2006.01)
*H05B 33/08* (2006.01)

(52) U.S. Cl.
CPC ..... *H05B 33/0848* (2013.01); *H05B 33/0809* (2013.01); *H05B 33/0887* (2013.01)

(58) Field of Classification Search
CPC ............ H05B 33/0848; H05B 33/0809; H05B 33/0887

USPC ......................................................... 315/302
See application file for complete search history.

(56) References Cited

U.S. PATENT DOCUMENTS

| | | | | |
|---|---|---|---|---|
| 8,471,497 B2* | 6/2013 | Ruan | .................. | H05B 33/0851 315/291 |
| 8,692,482 B2* | 4/2014 | Szczeszynski | ..... | H05B 33/0815 315/209 R |
| 8,749,163 B2* | 6/2014 | Phadke | .............. | H05B 33/0887 315/185 S |
| 9,265,110 B2* | 2/2016 | Yang | .................... | H05B 33/083 |
| 9,883,556 B2* | 1/2018 | Li | ...................... | H05B 33/0815 |
| 9,948,181 B2* | 4/2018 | Manohar | ............... | H02M 3/158 |

* cited by examiner

*Primary Examiner* — Don P Le

(57) ABSTRACT

A LED driving apparatus including a power converter, a judging module and a control module is disclosed. The power converter and the judging module are coupled to at least one LED respectively. The control module is coupled to the judging module. The control module includes a current source and a transconductance amplifier. The current source is coupled to an output terminal of the transconductance amplifier. The power converter converts an input voltage into an output voltage and transmits the output voltage to the at least one LED. The judging module judges whether a LED current is changed from a first LED current value to a second LED current value. If yes, the judging module generates a judging signal to the control module. The control module changes a current value of the current source and a transconductance of the transconductance amplifier.

16 Claims, 3 Drawing Sheets

LIGHT-EMITTING DIODE DRIVING APPARATUS AND OPERATING METHOD THEREOF

BACKGROUND OF THE INVENTION

Field of the Invention

The invention relates to driving a light-emitting diode (LED); in particular, to a LED driving apparatus and an operating method thereof.

Description of the Related Art

In general, because the conventional LED driver is usually operated in a mode of fixed power consumption and fixed frequency band, when the lightness of the LEDs needed to be changed, especially changed from the lowest lightness to the highest lightness, it takes a long changing time to finish the lightness change.

In general, because the conventional LED driver is usually operated in a mode of fixed power consumption and fixed frequency band, when the lightness of the LEDs needed to be changed, especially changed from the lowest lightness to the highest lightness, it takes a long changing time to finish the lightness change.

However, in practical applications, the LED current ILED fails to be immediately changed from the lowest current value I1 to the highest current value I3 at the first time T1 as shown by the dotted line in FIG. 1. Instead, it takes a long default time ΔT for the LED current ILED to be increased to the highest current value I3 at the second time T2. Therefore, the lightness changing speed of the LEDs will be poor and needed to be overcome.

SUMMARY OF THE INVENTION

Therefore, the invention provides a light-emitting diode (LED) driving apparatus and an operating method thereof to overcome the above-mentioned problems in the prior art.

An embodiment of the invention is a LED driving apparatus. In this embodiment, the LED driving apparatus is used for driving at least one LED. The LED driving apparatus includes a power converter, a judging module and a control module. The power converter and the judging module are coupled to at least one LED respectively. The control module is coupled to the judging module. The control module includes a current source and a transconductance amplifier. The current source is coupled to an output terminal of the transconductance amplifier. The power converter converts an input voltage into an output voltage and transmits the output voltage to the at least one LED. The judging module judges whether a LED current is changed from a first LED current value to a second LED current value. If a judging result of the judging module is yes, the judging module generates a judging signal to the control module. When the control module receives the judging signal, the control module changes a current value of the current source and a transconductance of the transconductance amplifier according to the judging signal.

In an embodiment, when the control module changes the current value of the current source and the transconductance of the transconductance amplifier according to the judging signal, the control module changes the current value of the current source from a first current value to a second current value and changes the transconductance of the transconductance amplifier from a first transconductance to a second transconductance.

In an embodiment, the second current value is larger than the first current value and the second transconductance is larger than the first transconductance.

In an embodiment, when the current value of the current source is changed to the second current value and the transconductance of the transconductance amplifier is changed to the second transconductance, the control module keeps the second current value and the second transconductance for a period of default time and then changes the current value of the current source back to the first current value and changes the transconductance of the transconductance amplifier back to the first transconductance.

In an embodiment, the control module further comprises a look-up table storing the second current value, the second transconductance and the period of default time corresponding to the LED current changed from the first LED current value to the second LED current value.

In an embodiment, the transconductance amplifier further comprises a first input terminal and at least one second input terminal, the first input terminal is coupled to a reference voltage and the at least one second input terminal is coupled to at least one LED voltage of the at least one LED.

In an embodiment, the second LED current value is larger than the first LED current value and a difference between the first LED current value and the second LED current value is larger than a default current difference.

In an embodiment, if the judging module judges that the LED current of the at least one LED is changed from the first LED current value to a third LED current value, and a difference between the first LED current value and the third LED current value is smaller than default current difference, then the judging module does not generate the judging signal to the control module.

In an embodiment, the LED current of the at least one LED is related to the output voltage, when the control module changes the current value of the current source and the transconductance of the transconductance amplifier according to the judging signal, changing speeds of the output voltage and the LED current are also increased accordingly.

In an embodiment, the control module further comprises a compensation unit coupled between the current source and the transconductance amplifier.

Another embodiment of the invention is a light-emitting diode (LED) driving apparatus operating method. In this embodiment, the LED driving apparatus operating method is used for operating a LED driving apparatus to drive at least one LED. The LED driving apparatus includes a power converter, a judging module and a control module. The power converter is coupled to the at least one LED. The judging module is coupled to the at least one LED. The control module is coupled to the judging module. The control module includes a transconductance amplifier and a current source coupled to an output terminal of the transconductance amplifier.

The LED driving apparatus operating method includes steps of: the power converter converting an input voltage into an output voltage and outputting the output voltage to the at least one LED; the judging module judging whether a LED current of the at least one LED is changed from a first LED current value to a second LED current value; if a judging result of the judging module is yes, the judging module generating a judging signal; and when the control module receives the judging signal, the control module changing a current value of the current source and a transconductance of the transconductance amplifier according to the judging signal.

Compared to the prior arts, when the lightness of the LEDs needed to be changed, especially changed from the lowest lightness to the highest lightness, the LED driving apparatus and operating method thereof can correspondingly increase the current value of the current source and the transconductance of the transconductance amplifier in the control module and keep the high current value and the high transconductance for a period of time to reduce the changing time needed for the LED current increasing to the target current value; therefore, the lightness changing speed of the LEDs can be effectively enhanced.

The advantage and spirit of the invention may be understood by the following detailed descriptions together with the appended drawings.

DETAILED DESCRIPTION

A preferred embodiment of the invention is a light-emitting diode (LED) driving apparatus. In this embodiment, the LED driving apparatus is used to drive at least one light-emitting diode disposed in a display, but not limited to this.

Figure 1:
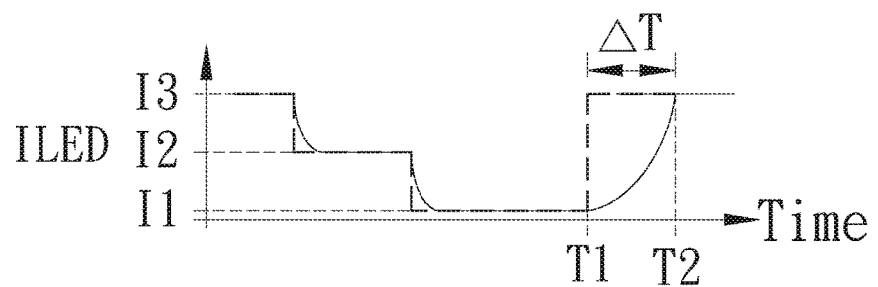
FIG. 1 illustrates a timing diagram of the LED current in the prior art.
Figure 2:
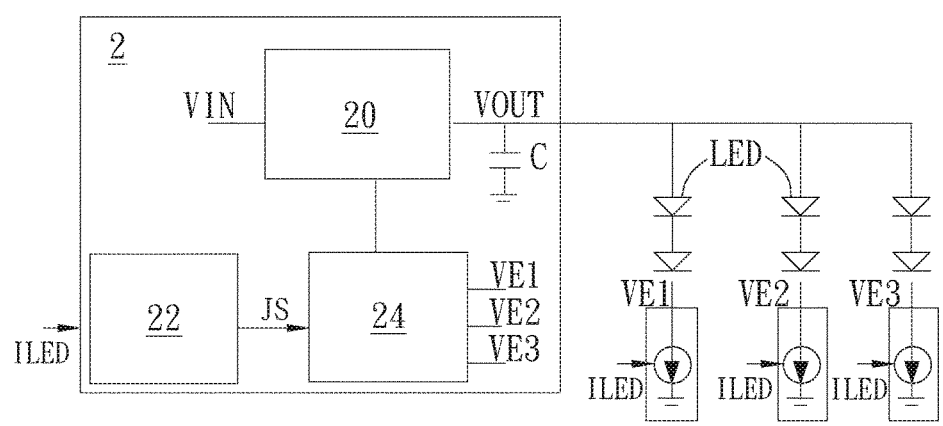
FIG. 2 illustrates a schematic diagram of the LED driving apparatus in an embodiment of the invention.
Figure 3:
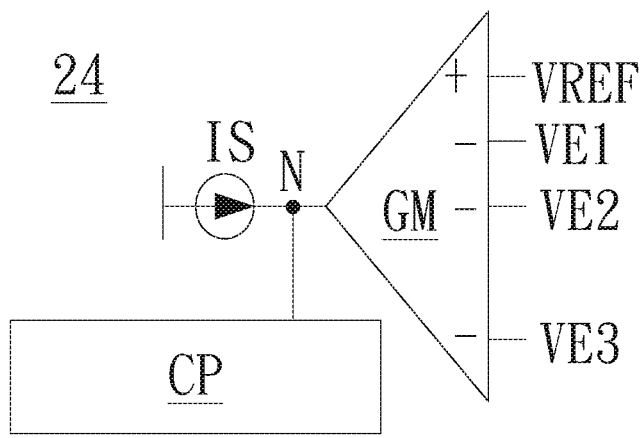
FIG. 3 illustrates a schematic diagram of the control module in the LED driving apparatus of the invention.

Please refer to FIG. 2 and FIG. 3. FIG. 2 illustrates a schematic diagram of the LED driving apparatus in this embodiment; FIG. 3 illustrates a schematic diagram of the control module in the LED driving apparatus.

As shown in FIG. 2, the LED driving apparatus 2 includes a power converter 20, a judging module 22 and a control module 24. The power converter 20 is coupled to at least one light-emitting diode LED. The judging module 22 is coupled to the at least one light-emitting diode LED. The control module 24 is coupled to the judging module 22 and the power converter 20 respectively. It should be noticed that the at least one light-emitting diode LED in this embodiment is arranged as three LED strings coupled in parallel, and the three LED strings all have the LED current ILED and have the LED voltages VE1~VE3 respectively, but not limited to this.

The power converter 20 is used to convert an input voltage VIN into an output voltage VOUT and output the output voltage VOUT to the light-emitting diode LED. The judging module 22 is used to receive the LED current ILED of the light-emitting diode LED and judge whether the LED current ILED is changed from a first LED current value IL1 to a second LED current value IL2. If a judging result of the judging module is yes, the judging module generates a judging signal to the control module. When the control module receives the judging signal, the control module changes a current value of the current source and a transconductance of the transconductance amplifier according to the judging signal.

In this embodiment, if the second LED current value IL2 is larger than the first LED current value IL1 and a difference between the first LED current value IL1 and the second LED current value IL2 is larger than a default current difference, the LED current ILED of the light-emitting diode LED will be largely increased.

It should be noticed that the lightness of the light-emitting diode LED is related to the LED current ILED; therefore, when the LED current ILED is largely increased, the lightness of the light-emitting diode LED will be also largely increased correspondingly, such as the condition that the lightness of the light-emitting diode LED is changed from the darkest to the brightest.

If the judging result of the judging module 22 is yes, namely the judging module 22 judges that the LED current ILED is changed from the first LED current value IL1 to the second LED current value IL2. At this time, the judging module 22 will generate a judging signal JS to the control module 24 to inform the control module 24 that long changing time in the prior art may occur at this time.

As shown in FIG. 3, the control module 24 can include a current source IS, a transconductance amplifier GM and a compensation unit CP. Wherein, the current source IS and an output terminal of the transconductance amplifier GM are coupled to a gain node N and the gain node N can be coupled to the power converter 20; the compensation unit CP is coupled between the current source IS and the transconductance amplifier GM; the transconductance amplifier GM further includes a first input terminal + and at least one second input terminal −, wherein the first input terminal + is coupled to a reference voltage VREF and the three second input terminals − are coupled to the LED voltages VE1~VE3 of the three LED strings respectively.

In order to improve the drawbacks of the prior art, when the control module 24 receives the judging signal JS from the judging module 22, the control module 24 will change the current value of the current source IS and the transconductance of the transconductance amplifier GM according to the judging signal JS. Since the LED current ILED is related to the output voltage VOUT, when the control module 24 changes the current value of the current source IS and the transconductance of the transconductance amplifier GM according to the judging signal JS, the changing speed of the output voltage VOUT and the LED current ILED will be also increased accordingly.

Figure 4:
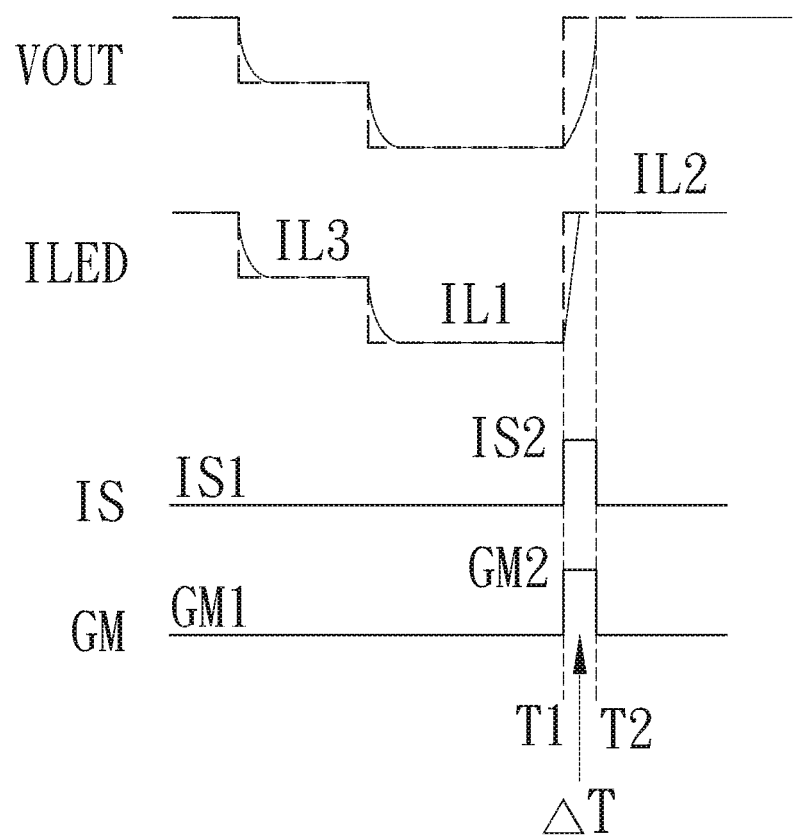
FIG. 4 illustrates timing diagrams of the output voltage, the LED current, the current value of the current source and the transconductance of the transconductance amplifier of the invention.

For example, as shown in FIG. 4, at a first time T1, when the control module 24 receives the judging signal JS from the judging module 22, the control module 24 will change the current value of the current source IS from a first current value IS1 to a second current value IS2 and change the transconductance of the transconductance amplifier GM from a first transconductance GM1 to a second transconductance GM2.

It should be noticed that, in order to effectively increase gain, the second current value IS2 is larger than the first current value IS1 and the second transconductance GM2 is larger than the first transconductance GM1; that is to say, the control module 24 will increase the current value of the current source IS and the transconductance of the transconductance amplifier GM at the first time T1, and the control module 24 will keep the current value of the current source IS at the second current value IS2 and keep the transconductance of the transconductance amplifier GM at the second transconductance GM2 during a period of time ΔT until a second time T2. At the second time T2, the control module 24 will change the current value of the current source IS back to the first current value IS1 and change the transconductance of the transconductance amplifier GM back to the first transconductance GM1.

When the current value of the current source IS is kept at the higher second current value IS2 and the transconductance of the transconductance amplifier GM is kept at the higher second transconductance GM2 during the period of default time ΔT, the gain node N between the current source IS and the transconductance amplifier GM can provide larger gain to the power converter 20, so that the increasing speed of the output voltage VOUT of the power converter 20 will become faster and the increasing speed of the LED current ILED will also become faster accordingly. Therefore, compared to the prior art, the invention can largely reduce the default time ΔT needed for the LED current ILED increasing from the first LED current value IL1 to the second LED current value IL2; that is to say, the default time ΔT needed for the light-emitting diode LED changing its lightness from the lowest lightness to the highest lightness can be largely reduced to improve the lightness changing speed of the light-emitting diode LED, so that the poor lightness changing speed of the prior art can be effectively solved.

In practical applications, the control module 24 can also include a look-up table (not shown in the figures). The look-up table can be used to store some information such as the second current value IS2, the second transconductance GM2 and the period of default time ΔT corresponding to the LED current ILED changed from the first LED current value IL1 to the second LED current value IL2 and these information can be used by the control module 24.

It should be noticed that if the judging module 22 judges that the LED current ILED is changed from the first LED current value IL1 to a third LED current value IL3, and the difference between the first LED current value IL1 and the third LED current value IL3 is smaller than the default current difference, it means that the LED current ILED only has small change; therefore, the judging module 22 will not generate the judging signal JS to the control module 24, and the control module 24 will keep the original current value of the current source IS and the original transconductance of the transconductance amplifier GM unchanged instead of changing the current value of the current source IS and the transconductance of the transconductance amplifier GM.

Another embodiment of the invention is a light-emitting diode (LED) driving apparatus operating method. In this embodiment, the LED driving apparatus operating method is used for operating a LED driving apparatus to drive at least one LED. The LED driving apparatus includes a power converter, a judging module and a control module. The power converter is coupled to the at least one LED. The judging module is coupled to the at least one LED. The control module is coupled to the judging module. The control module includes a transconductance amplifier and a current source coupled to an output terminal of the transconductance amplifier.

Figure 5:
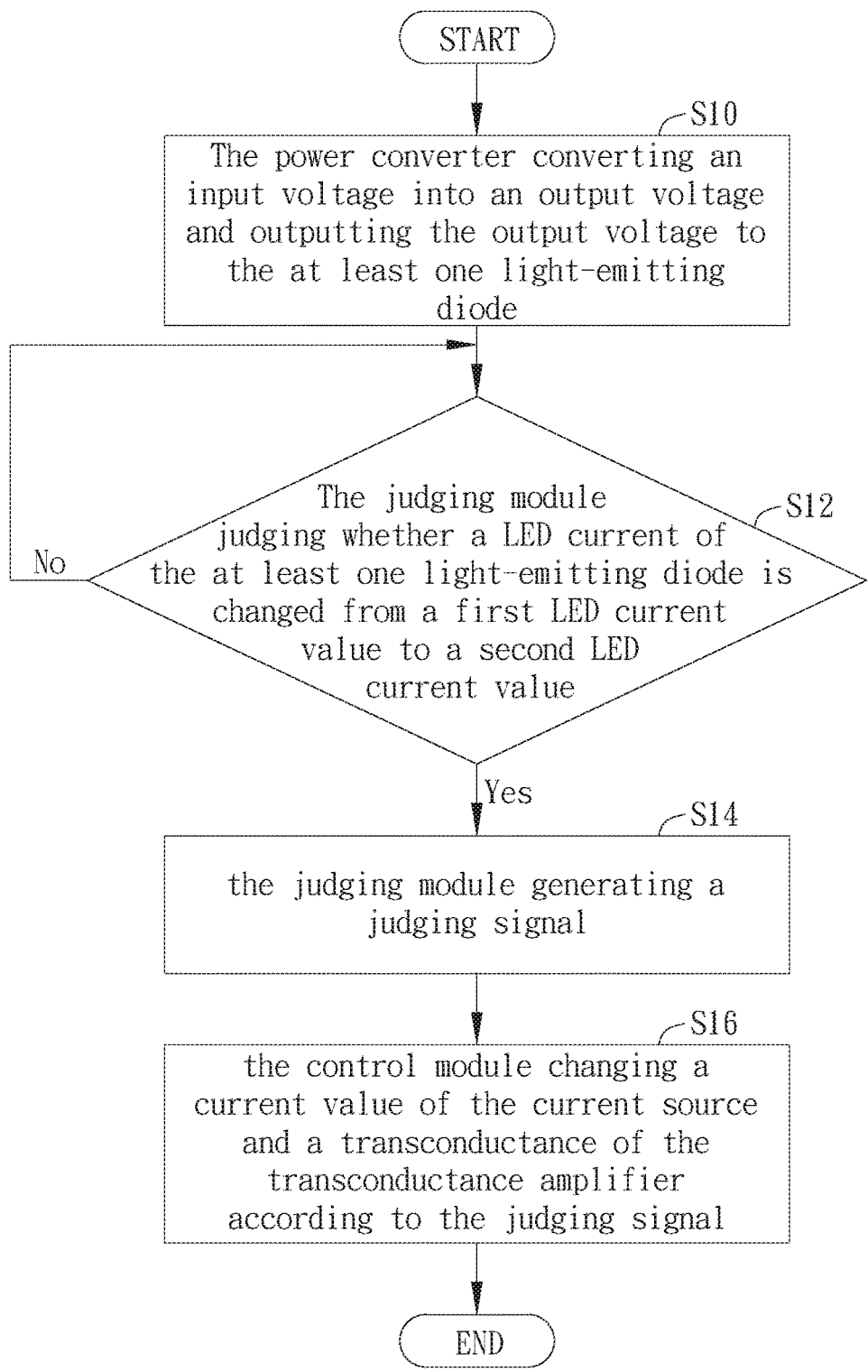
FIG. 5 illustrates a flowchart of the LED driving apparatus operating method in another embodiment of the invention.

Please refer to FIG. 5. FIG. 5 illustrates a flowchart of the LED driving apparatus operating method in this embodiment. As shown in FIG. 5, the LED driving apparatus operating method can include the following steps of:

Step S10: the power converter converting an input voltage into an output voltage and outputting the output voltage to the at least one light-emitting diode;

Step S14: if a judging result of the judging module in Step S12 is yes, the judging module generating a judging signal; and Step S16: when the control module receives the judging signal, the control module changing a current value of the current source and a transconductance of the transconductance amplifier according to the judging signal.

It should be noticed that the LED current of the light-emitting diodes will be related to the output voltage of the power converter; therefore, when the control module changes the current value of the current source and the transconductance of the transconductance amplifier according to the judging signal, the changing speeds of the output voltage and the LED current will be also increased accordingly.

In an embodiment, when the control module changes the current value of the current source and the transconductance of the transconductance amplifier according to the judging signal, the control module can change the current value of the current source from a first current value to a second current value and change the transconductance of the transconductance amplifier from a first transconductance to a second transconductance, wherein the second current value can be larger than the first current value and the second transconductance can be larger than the first transconductance.

In addition, in another embodiment, when the current value of the current source is changed to the second current value and the transconductance of the transconductance amplifier is changed to the second transconductance, the control module can keep the second current value and the second transconductance for a period of default time and then change the current value of the current source back to the first current value and change the transconductance of the transconductance amplifier back to the first transconductance.

Compared to the prior arts, when the lightness of the LEDs needed to be changed, especially changed from the lowest lightness to the highest lightness, the LED driving apparatus and operating method thereof can correspondingly increase the current value of the current source and the transconductance of the transconductance amplifier in the control module and keep the high current value and the high transconductance for a period of time to reduce the changing time needed for the LED current increasing to the target current value; therefore, the lightness changing speed of the LEDs can be effectively enhanced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A light-emitting diode (LED) driving apparatus, for driving at least one LED, comprising:
    a power converter, coupled to the at least one LED, for converting an input voltage into an output voltage and outputting the output voltage to the at least one LED;
    a judging module, coupled to the at least one LED, for judging whether a LED current of the at least one LED is changed from a first LED current value to a second LED current value, if a judging result of the judging module is yes, the judging module generating a judging signal; and
    a control module, coupled to the judging module, comprising a transconductance amplifier and a current source coupled to an output terminal of the transconductance amplifier, when the control module receives the judging signal, the control module changing a current value of the current source and a transconductance of the transconductance amplifier according to the judging signal;

when the control module changes the current value of the current source and the transconductance of the transconductance amplifier according to the judging signal, the control module changes the current value of the current source from a first current value to a second current value and changes the transconductance of the transconductance amplifier from a first transconductance to a second transconductance, when the current value of the current source is changed to the second current value and the transconductance of the transconductance amplifier is changed to the second transconductance, the control module keeps the second current value and the second transconductance for a period of default time and then changes the current value of the current source back to the first current value and changes the transconductance of the transconductance amplifier back to the first transconductance.

2. The LED driving apparatus of claim 1, wherein the second current value is larger than the first current value and the second transconductance is larger than the first transconductance.

3. The LED driving apparatus of claim 1, wherein the control module further comprises a look-up table storing the second current value, the second transconductance and the period of default time corresponding to the LED current changed from the first LED current value to the second LED current value.

4. The LED driving apparatus of claim 1, wherein the transconductance amplifier further comprises a first input terminal and at least one second input terminal, the first input terminal is coupled to a reference voltage and the at least one second input terminal is coupled to at least one LED voltage of the at least one LED.

5. The LED driving apparatus of claim 1, wherein the LED current of the at least one LED is related to the output voltage, when the control module changes the current value of the current source and the transconductance of the transconductance amplifier according to the judging signal, changing speeds of the output voltage and the LED current are also increased accordingly.

6. The LED driving apparatus of claim 1, wherein the control module further comprises a compensation unit coupled between the current source and the transconductance amplifier.

7. A light-emitting diode (LED) driving apparatus, for driving at least one LED, comprising:
a power converter, coupled to the at least one LED, for converting an input voltage into an output voltage and outputting the output voltage to the at least one LED;
a judging module, coupled to the at least one LED, for judging whether a LED current of the at least one LED is changed from a first LED current value to a second LED current value, if a judging result of the judging module is yes, the judging module generating a judging signal; and
a control module, coupled to the judging module, comprising a transconductance amplifier and a current source coupled to an output terminal of the transconductance amplifier, when the control module receives the judging signal, the control module changing a current value of the current source and a transconductance of the transconductance amplifier according to the judging signal;

wherein the second LED current value is larger than the first LED current value and a difference between the first LED current value and the second LED current value is larger than a default current difference, if the judging module judges that the LED current of the at least one LED is changed from the first LED current value to a third LED current value, and a difference between the first LED current value and the third LED current value is smaller than default current difference, then the judging module does not generate the judging signal to the control module.

8. A light-emitting diode (LED) driving apparatus operating method used for operating a LED driving apparatus to drive at least one LED, the LED driving apparatus comprising a power converter, a judging module and a control module, the power converter being coupled to the at least one LED, the judging module being coupled to the at least one LED, the control module being coupled to the judging module, the control module comprising a transconductance amplifier and a current source coupled to an output terminal of the transconductance amplifier, the LED driving apparatus operating method comprising steps of:
the power converter converting an input voltage into an output voltage and outputting the output voltage to the at least one LED;
the judging module judging whether a LED current of the at least one LED is changed from a first LED current value to a second LED current value;
if a judging result of the judging module is yes, the judging module generating a judging signal; and
when the control module receives the judging signal, the control module changing a current value of the current source and a transconductance of the transconductance amplifier according to the judging signal;
wherein the control module further comprises a compensation unit coupled between the current source and the transconductance amplifier.

9. The LED driving apparatus operating method of claim 8, wherein when the control module changes the current value of the current source and the transconductance of the transconductance amplifier according to the judging signal, the control module changes the current value of the current source from a first current value to a second current value and changes the transconductance of the transconductance amplifier from a first transconductance to a second transconductance.

10. The LED driving apparatus operating method of claim 9, wherein the second current value is larger than the first current value and the second transconductance is larger than the first transconductance.

11. The LED driving apparatus operating method of claim 9, wherein when the current value of the current source is changed to the second current value and the transconductance of the transconductance amplifier is changed to the second transconductance, the control module keeps the second current value and the second transconductance for a period of default time and then changes the current value of the current source back to the first current value and changes the transconductance of the transconductance amplifier back to the first transconductance.

12. The LED driving apparatus operating method of claim 11, wherein the control module further comprises a look-up table storing the second current value, the second transconductance and the period of default time corresponding to the LED current changed from the first LED current value to the second LED current value.

13. The LED driving apparatus operating method of claim 8, wherein the transconductance amplifier further comprises a first input terminal and at least one second input terminal, the first input terminal is coupled to a reference voltage and the at least one second input terminal is coupled to at least one LED voltage of the at least one LED.

14. The LED driving apparatus operating method of claim 8, wherein the second LED current value is larger than the first LED current value and a difference between the first LED current value and the second LED current value is larger than a default current difference.

15. The LED driving apparatus operating method of claim 14, wherein if the judging module judges that the LED current of the at least one LED is changed from the first LED current value to a third LED current value, and a difference between the first LED current value and the third LED current value is smaller than default current difference, then the judging module does not generate the judging signal to the control module.

16. The LED driving apparatus operating method of claim 8, wherein the LED current of the at least one LED is related to the output voltage, when the control module changes the current value of the current source and the transconductance of the transconductance amplifier according to the judging signal, changing speeds of the output voltage and the LED current are also increased accordingly.

* * * * *